No. 829,795. PATENTED AUG. 28, 1906.
J. F. LOMPREY & I. J. BUDLONG.
MATCHER HEAD.
APPLICATION FILED SEPT. 22, 1905.
2 SHEETS—SHEET 1.
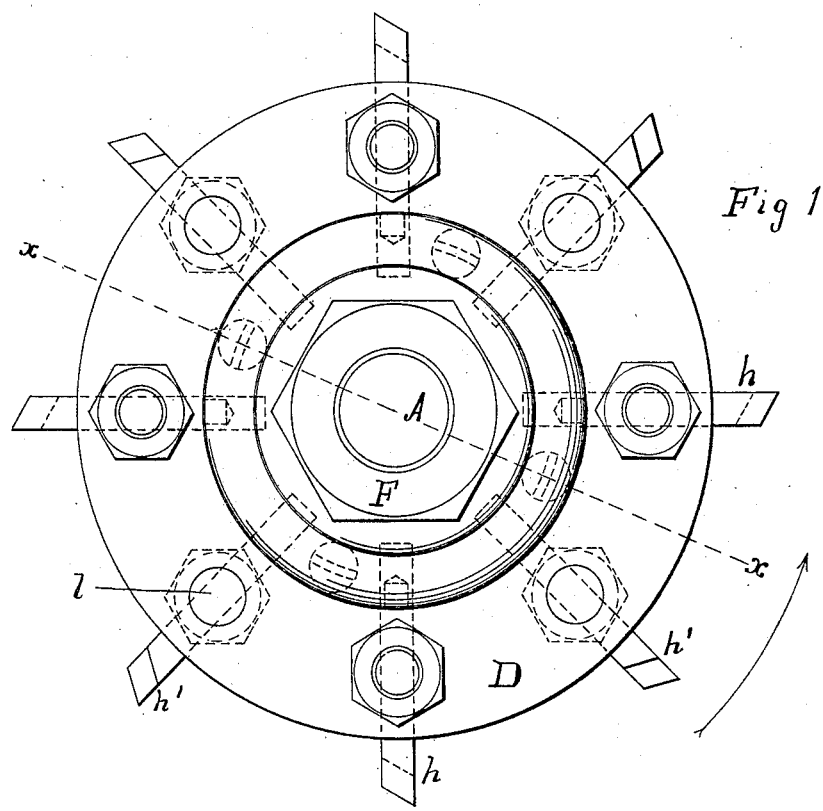
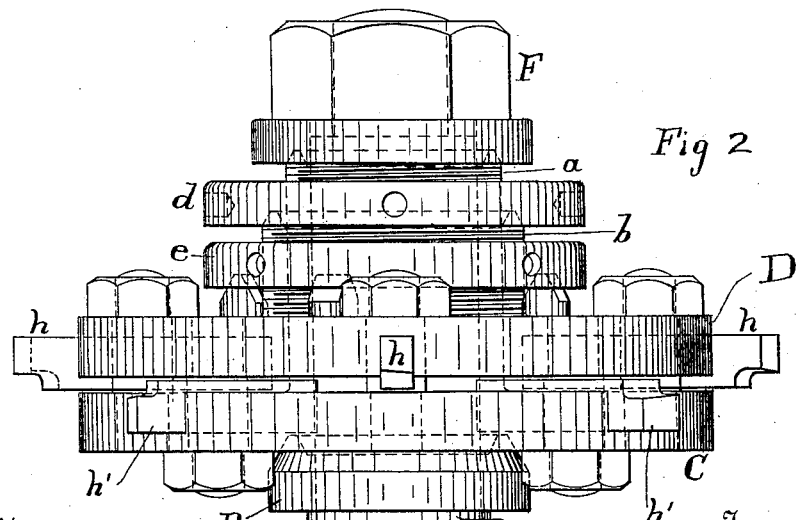

No. 829,795. PATENTED AUG. 28, 1906.
J. F. LOMPREY & I. J. BUDLONG.
MATCHER HEAD.
APPLICATION FILED SEPT. 22, 1905.

2 SHEETS—SHEET 2.

Witnesses
C. M. Catlin
E. H. Kolb

Inventors
J. F. Lomprey & I. J. Budlong,
By Their Attorney
Benj. R. Catlin

UNITED STATES PATENT OFFICE.

JERRY F. LOMPREY, OF DETROIT, MICHIGAN, AND IRVING J. BUDLONG, OF AURORA, ILLINOIS, ASSIGNORS TO AMERICAN WOOD WORKING MACHINERY COMPANY, OF NEW YORK, N. Y., A CORPORATION OF PENNSYLVANIA.

MATCHER-HEAD.

No. 829,795.     Specification of Letters Patent.     Patented Aug. 28, 1906.

Application filed September 22, 1905. Serial No. 279,628.

*To all whom it may concern:*

Be it known that we, JERRY F. LOMPREY, of Detroit, in the county of Wayne and State of Michigan, and IRVING J. BUDLONG, of Aurora, in the county of Kane and State of Illinois, have invented certain new and useful Improvements in Matcher-Heads, of which the following is a specification.

Our invention relates to cutter-heads for tonguing and grooving lumber for flooring, ceiling, and similar uses; and it consists, mainly, in devices for adjusting the sets of cutters employed in a matcher-head and adapting them to cut different sizes of tongues and grooves without removing the cutters or the head from its arbor.

It further consists in a novel method of securing the matcher-head to the spindle on which it runs and in locking all the adjusting parts in a secure manner.

Figure 3:
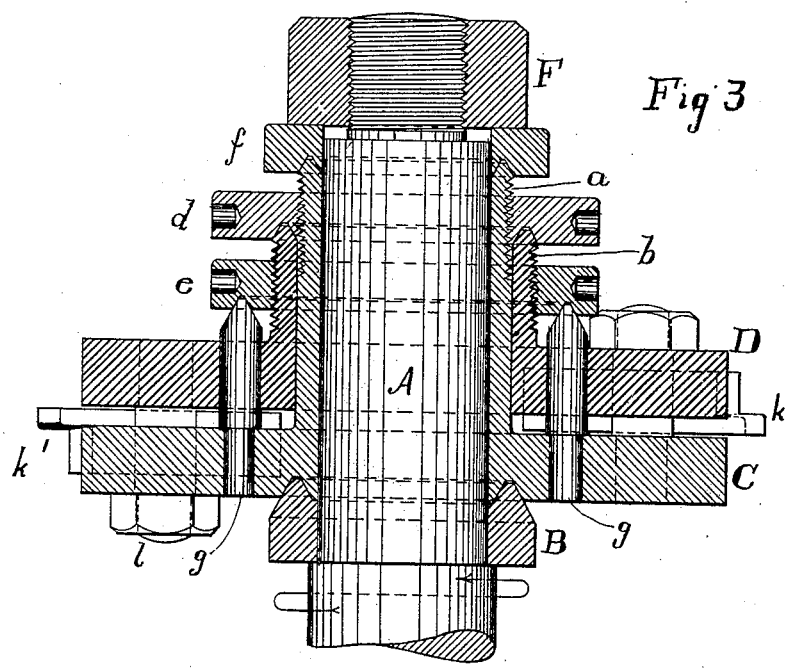
Figure 4:
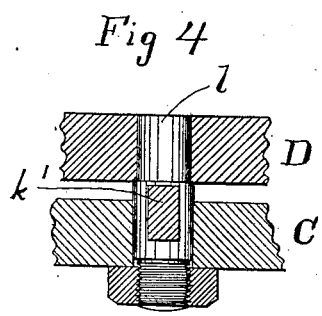

In the drawings, Figure 1 is a plan view of our improved matcher-head equipped with a set of tonguing-cutters. Fig. 2 is a side elevation of the same. Fig. 3 is a sectional elevation of a head at the line $x\ x$ of Fig. 1 shown equipped with grooving-cutters. Fig. 4 is a broken section indicating means for clamping the knives in the flanges.

Reference-letter A denotes the spindle or arbor to which the head is secured, and it may be of any convenient diameter where the head is attached and have suitable bearings on the machine in which it is used. This arbor is shouldered near the top end to receive a collar B, which is shrunk or pressed on, so as to be substantially one with the arbor. This collar has an annular V-rib on its upper face which exactly fits a corresponding groove in the flange C. This flange is secured to or made one with the sleeve $a$, which is bored out to slip onto the arbor A. The lower portion of the sleeve $a$ is turned off to receive a second flange D of the same diameter as C, and a sleeve $b$ is made one with or rigidly secured to it. The outside of the sleeve $b$ and the upper portion of the sleeve $a$ are threaded to receive collars, spanner-nuts, or rings $d\ e$, and the lower face of these rings is grooved V-shaped similarly to the groove in the flange C. The upper end of the sleeve $b$ is made V-shaped to fit accurately in the groove in the spanner-nut $d$, as shown in Fig. 3, and the corresponding end of the sleeve $a$ fits into a similar groove in a collar $f$, which is bored to fit closely on the arbor A. The nut F, threaded upon this arbor, secures the matcher-head firmly to the arbor. Several studs $g$ are rigidly secured to the lower flange C in a concentric position with reference to the arbor A, and the upper ends of these studs project through openings in flange D and are turned off to fit accurately into the V-groove in the spanner-nut $e$.

The cutters $h$, Figs. 1 and 2, are secured in radial or substantially radial grooves in the under side of the flange D, and the corresponding cutters $h'$ are likewise attached to the flange C by means of bolts or studs $l$, which are diametrically slotted to receive the cutters, and the latter are clamped to their respective flanges by nuts on the studs, as indicated in Fig. 4. These two sets of cutters are ground to form the tongue, and the other two sets $k$ and $k'$, Fig. 3, are ground to form the corresponding groove. It will be seen that the cutters in each set $h$ and $h'$, $k$ and $k'$ are arranged alternately on their respective flanges, so that when the latter are moved to and from each other the body portion of the cutters will pass each other, and thus permit the expansion and contraction of the matcher-head, as hereinafter explained. This method of attaching cutters to matcher-heads is not new, and we make no claim thereto, as other methods of securing the cutters will operate satisfactorily in connection with our invention, provided the sets of cutters and fasteners are so arranged as not to interfere with each other when thus adjusted.

From the foregoing description it will be evident that when the nut $e$ is screwed down firmly against the studs or pins $g$ and the nut $d$ against the sleeve $b$ the two flanges C and D, carrying the sets of tongue-and-groove cutters, will be securely locked together at a predetermined relative position, and the cutters thus form a tongue and groove of a certain width; but when it is desired to change such width nut $d$ is slacked and nut $e$ turned either up or down, as the case may be, thus adjusting flanges C and D and varying the position of the sets of cutters apart, and consequently the width of the tongue and groove. By screwing down collar $d$ again to its place the parts are locked securely in their new position.

The object of the V-shaped grooves in flange C and collars d e f is to retain all the parts in exact concentricity with the arbor A. This is especially desirable in matcher-heads running at a high speed and operating on hard wood. In the ordinary construction of matcher-heads it often happens that the bore loosely fits the arbor, and when secured to the latter in the usual way by set-screws or clamping-nuts the heads run slightly eccentric, and thus do imperfect work. By our construction the collar B being rigidly attached to the arbor accurately centers the main body of the matcher-head, and the top collar f centers the sleeve a, so that although there might be a loose fit between the main flange C and the arbor A, caused by variations in gaging or by wear between the surfaces, the cutters would still run absolutely concentric with the arbor at all times. It will be seen also that the nut F forces the collar f against the sleeve a and in turn clamps the flange C against the fixed collar B, thus firmly securing the entire cutter-head to the arbor A.

Having thus set forth our invention, what we claim, and desire to secure by Letters Patent, is—

1. In a matcher-head the combination of two cutter-carrying members, having sleeves fitted to slide upon each other longitudinally of their common arbor, connecting members exterior to the sleeves rigidly secured to one cutter-carrying member and passing freely through the other, and an adjusting member acting on the connecting devices to adjust the cutter-carrying members relatively, substantially as described.

2. In a matcher-head, the combination of two cutter-carrying members having sleeves fitted to slide upon each other longitudinally of their common arbor, connecting members exterior to the sleeves rigidly secured to one cutter-carrying member and passing freely through the other, an adjusting member acting on the connecting devices, and a locking member arranged to secure the parts in a fixed relative position after adjustment, substantially as described.

3. In a matcher-head, the combination of two sleeves provided with flanges, one of said sleeves sliding upon the other longitudinally of their common arbor, suitable devices for clamping cutters to said flanges, studs or pins rigidly attached to one flange and passing freely through the other, an adjusting-collar threaded on one sleeve and acting in said studs, for determining the relative distance between said flanges substantially as set forth.

4. In a matcher-head the combination of two sleeves provided with flanges, one of said sleeves sliding upon the other longitudinally of their common arbor, devices for clamping cutters to said flanges, studs secured to one flange and passing freely through the other, an adjusting-collar threaded on the sleeve of one flange and operating against said studs, and a locking-collar threaded on the sleeve of the other flange, operating substantially as set forth.

5. In a matcher-head, the combination of a cutter-carrying member, a supporting-arbor, a collar firmly secured to the same and provided on its upper surface with an annular V-rib fitting into a corresponding groove in said cutter-carrying member, and a nut on the arbor operating to clamp and centralize the head substantially as set forth.

6. In a matcher-head, the combination of cutter-carrying members, a supporting-arbor, a collar secured tightly thereto and provided with an annular V-rib fitting a corresponding groove in the principal cutter-carrying member, a clamping-collar with an annular V-groove fitting a corresponding V-rib on the upper portion of said cutter member, and a binding-nut, all operating to clamp and centralize the head upon its arbor, substantially as set forth.

7. In a matcher-head, the combination of a supporting-arbor, cutter-carrying members fitted thereto and to slide upon each other lengthwise of said arbor, centralizing-collars with V-ribs fitting corresponding parts of the cutter-carrying members, a locking-collar threaded upon one cutter-carrying member and clamping the other, substantially as described.

8. In a matcher-head, the combination of the arbor A, the rigid collar B, provided on its face with an annular V-rib, the main cutter-carrying flange C, fitted to said annular V-rib and the clamping-nut F arranged and operating substantially as set forth.

9. In a matcher-head, the combination of two cutter-carrying members fitted to slide one upon the other longitudinally with respect to their common arbor, a plurality of connecting members rigidly secured to one cutter-carrying member and passing freely through the other, and an adjusting-collar acting on said connecting members.

JERRY F. LOMPREY.
IRVING J. BUDLONG.

Witnesses:
H. J. WEBB,
WM. M. WING.